United States

Lomasney et al.

[11] 3,717,606
[45] Feb. 20, 1973

[54] SOLVENTLESS COAL TAR EXTENDED ANTIFOULING COATING

[76] Inventors: Henry L. Lomasney, 11119 Prentiss Avenue, New Orleans, La. 70107; William J. Lomasney, 13050 Chateau Court, New Orleans, La. 70129

[22] Filed: April 5, 1971

[21] Appl. No.: 131,479

[52] U.S. Cl. .........260/40 R, 106/15 AF, 260/37 EP, 260/37 N
[51] Int. Cl. .............................................C08g 51/04
[58] Field of Search.........260/37 EP, 28; 106/15 AF; 117/75, 132 B; 43/131

[56] References Cited

UNITED STATES PATENTS

| | | | |
|---|---|---|---|
| 3,154,460 | 10/1964 | Graner et al. | 106/15 AF X |
| 3,575,123 | 4/1971 | Shepherd et al. | 106/15 AF X |
| 3,266,913 | 8/1966 | Hardy et al. | 106/15 AF |
| 2,765,288 | 10/1956 | Whittier et al. | 260/37 EP UX |
| 3,426,473 | 2/1969 | Cardarelli et al. | 106/15 AF X |
| 2,956,034 | 10/1960 | Simpson | 260/37 EP |
| 3,015,635 | 1/1962 | Bradley et al. | 260/28 X |
| 3,105,771 | 10/1963 | Simpson et al. | 260/28 X |
| 3,523,103 | 8/1970 | Zemlin | 260/28 X |
| 3,100,719 | 8/1963 | Dunn et al. | 106/15 AF X |

*Primary Examiner*—Lewis T. Jacobs
*Attorney*—Royance, Abrams, Berdo, Kaul & Farley

[57] ABSTRACT

The present invention relates to a novel coating composition which is an effective heavy duty marine antifouling film with significantly subdued human toxicological effects and which comprises a low molecular weight aromatic bitumen or related polyol; a highly polymerizable, or chemically crosslinking, film former (possessing exceptionally low initial molecular weight); and one or more highly toxic organo-metallic compounds. Specifically, the invention allows a unique approach toward formulating an antifouling marine coating which possesses the antifouling properties inherent in the extremely toxic microbiological poisons normally employed in such coatings yet which present a relatively safe working environment for humans. The technological significance rests in the fact that, during the transgression through the film forming phenomena, the design outline herein provides the confinement of the toxic adducts within the coating film, and precludes their migration or atomization to the surrounding atmosphere. The incorporation of a low molecular weight bituminous residue in the present coating affords significant control of film properties of the toxic coating.

The unique concept in antifoul coatings drastically alters the concern for adequate "dry time" before launch because the water sensitivity heretofore experienced in the early stage of curing of solvent releasing coating systems does not exist with this concept.

4 Claims, No Drawings

3,717,606

SOLVENTLESS COAL TAR EXTENDED ANTIFOULING COATING

BACKGROUND OF THE INVENTION

Those persons schooled in the art of marine coatings are aware of problems which are associated with resisting the attachment and growth of the thousands of forms of marine fouling organisms. The many types of antifouling chemicals and composition which have been developed over the centuries and, most important, over recent decades have had essentially one characteristic in common. They protect by presenting an undesirable environment to the fouling growth by exuding or exposing a toxic chemical.

In heretofore developed antifouling coating formulas, the industry has seen a migration to various toxic metallic substances and oxides thereof, such as copper and mercury containing compounds. More recently, the marine industry has encountered increasing costs resulting from out-of-service time and dry dock services due, in part, to the size and complexity of modern vessels. Spurred by this need for longer lived antifouling coatings, the manufacturer has directed his attention toward the more toxic compounds, such as tributyltin oxide, tributylin lead acetate, triphenol lead and similar organo-metallic compounds.

Of added significance is the general recognition of the fact that the life-time of the present hull bottom coatings incorporating these highly toxic organo-metallic compounds are, to a large degree, less reactive in the electro-chemical corrosion phenomena and consequently are more desirable as coatings for hulls fabricated of aluminum or steel.

As a result of these developments, there has been a significant increase in the level of toxication to which workmen handling such coatings have been exposed. There have been four significant factors whereby the more recent prior art antifouling coatings have emphasized this already unhealthy environment.

1. Newer coatings contain more lethal toxicants in larger quantity than did older formulas.
2. Prior art coatings contain highly volatile solvent systems which have a strong ability to permeate the work areas and which can act as carriers for the less volatile organo-metallic compounds.
3. Frequently, marine antifouling coatings are spray applied, allowing for volatilization of significantly more toxicants than would be released during application by roller or brush.
4. Marine antifouling coatings are applied at 8 to 10 mils wet film thickness as opposed to 2 mils for older generation materials, thereby increasing the quantity of material to which humans must be exposed.

Inhalation exposures have been conducted in which albino rats were exposed to the spray produced by a commercial paint sprayer containing prior art organo-metallic toxicated coatings. The results obtained indicated that such spray is definitely damaging to the respiratory system.

In order to improve the atmosphere into which the applicator must function without compromising the level of fouling resistance, the prior art hull-bottom coatings have primarily focused attention toward protecting the worker solely by placing them within protective sheathing (frequently of rather elaborate proportion), such as organic vapor "masks," fresh air hoods, disposable clothing, throw-away gloves, and related protective devices.

All heretofore formulated antifouling coatings have incorporated volatile "solvent-type" vehicles in the coating formulas. It has been shown in laboratory testing that the solvents contribute favorably to the migration and release of the toxicants.

The American Conference of Governmental-Industrial Hygenists have established a Threshold Limit Value for repeated exposure of personnel to organo-metallic compounds. The selection of 0.1 MG/M3 has been established on the basis of toxicity of ethyltin compounds.

It was shown in tests that no prior art coating could be produced which, when routinely spray applied in a confined area, could be maintained below the recognized maximum level of toxication.

The subject of this patent is a novel means of formulation of a marine antifouling coating which is specifically addressed to the containment of the toxic adducts during the application and curing phases.

In Whittier U.S. Pat. No. 2,765,288, it has been proposed that it is possible to formulate a workable resin pitch formulation from which the aromatic hydrocarbon vehicle may be excluded if a workable viscosity is obtained without the same. However, it could not be predicted from this conclusion that such a formulation could be combined with antifouling chemical toxicants to successfully combat the human toxological discomforts occasioned by heretofore formulated antifouling coatings.

SUMMARY

The present invention provides an antifouling coating comprising a crosslinked essentially non-volatile synthetic polymer; a porous pigment; and a high molecular weight toxicant compound capable of being absorbed by said pigment whereby said compound is confined therein during application and curing of said polymer. The polymer preferably is of a molecular weight less than 2,000 or especially between 300 to 800. Epoxy and polyurethane resins are preferred, especially epichlorohydrin - bisphenol A epoxy resins having a molecular weight of from about 250 to about 500.

The use of extender pigments is well known and practiced in the art and can comprise any of those commonly employed in the coating art. The pigment preferably has a porosity sufficient to absorb the toxicant material, and especially is a material which degrades or decomposes upon exposure to water over a period of time.

The toxicant material must be of high molecular weight to the extent that it is not highly volatile.

Other materials are added to the present coating formulation whereby its properties can be optimized depending upon the application involved.

DESCRIPTION OF THE PREFERRED EMBODIMENT

While not wishing to be bound in detail by any of these postulates, experimentation has shown that the following properties have been found useful for confinement or containment of the toxicant within the coating solution, (both during application and within the subsequent wet film cure cycle).

The toxicant selection is restricted to materials whose vapor pressure is sufficiently above ambient to preclude (as much as possible) its volatilization during normal application temperatures and pressures.

The formulation must encompass a crosslinking resin which can be compounded to a workable viscosity without the need for a significant percentage of volatile constituents.

Successful marine coatings have been formulated pursuant to the present discovery using Epichlorohydrin/Bisphenol A resins in combination with low molecular weight bituminous resin extenders and/or low molecular weight polyols. Also, isocyanate terminated prepolymers have been formulated in combination with low molecular weigh bituminous resin extenders. This combination also provides an essentially 100 percent solids antifouling coating having a workable viscosity. Such a coating has been successfully spray applied without the need for incorporating therein a volatile solvent or aromatic hydrocarbon vehicle. Polyester resins in combination with suitable extenders may be considered candidates where application can be accomplished within the potlife limits of the catalyzed coating.

In concert with this concept, certain pigmentation can be incorporated whose structure tends to control leeching of the toxicant material and restrict them to the uncured coating film. These include certain amorphous pigments, such as pyrogenic silica, which probably confines the toxicant either through a chemisoption phenomena, or through a capillary action. The presence of such pigmentation in a properly formulated coating subsequently affords a more permeable membrane. This desirable property allows the minute transgression of toxicant to the membrane/media interface during the service-life of the coating. This unexpected feature of the present invention represents a preferred embodiment.

The crosslinking component represents the polymerizable medium of the coating. It must be of sufficiently low molecular weight — i.e., preferably within a range of 300 to 800 units — in order to allow the combined coating system to flow freely during application. Ideally, it will be highly reactive such that when combined with the curing agent, the polymerization (crosslinking) will proceed to a suitable density to assure a tough film.

Although any crosslinking resin can be considered a candidate for this concept, it has been generally observed that epoxy, polyester, or polyurethane polymers will present the most favorable overall properties.

There are myriad epoxy compounds available that can be employed in the instant invention which are generally marketed under various trademark designations, such as Shell Chemical Company's Epon Resins numbers 812, 815, 820, 826, 828, and the like. Generally, the epoxy resin can be any polymeric material formed by the polymerization of a monomer having a oxirane ring with a monomer having a dihydroxyl structure. Epoxy resins are generally marketed in the form of various combinations of these basic monomers, that is, polymers thereof, and what is referred to as an uncured state. These materials as prepared from the above monomers can be then cured whether by crosslinking or by self-polymerization. Crosslinking agents or hardeners are mixed into these monomers whereby the reactive group of the hardener reacts with the epoxy group and thereby becomes an integral part of the molecular structure. Typical crosslinking agents are primary and secondary aliphatic polyamines, e.g. diethylene triamine; and anhydrides and polybasic acids, e.g. tetrahydrophthalic anhydride. On the other hand, a catalyst only permits the epoxy molecules to co-react with one another and hence do not end up in the molecular change, e.g. such materials as boron trifluoride monoethyl amine, and the like. Exemplary of various uncured epoxy resins, or monomers, that can be employed as the vehicle in the present invention are: triglycidyl ether of glycerol [1,2,3 - tris (2,3 - epoxy-propoxy) propane]; diglycidyl (ether of bisphenol A ($n=0$) (2,2 - bis [p - (2,3 - epoxypropoxy) phenyl]; and the like.

Epoxy resins made by reaction of epichlorohudrin with polyhdroxy compounds, such as bisphenol —A, are preferred for use in the instant invention since these materials exhibit a combination of physical and chemical properties. These properties coupled with the fact that they are readily available make them suitable for use in the instant invention. However, other epoxy compounds such as epoxy novalak resins, p-aminophenyl epoxies and cycloaliphatic epoxy resins are also suitable.

Polyesters that can be employed in the instant invention are for example, those produced by reaction of dibasic acids with dihydric alcohols and are generally prepared by fusing a mixture of phthalic anhydride, maleic anhydride, and propylene glycol at 200° C under an inert gas blanket. Low molecular unsaturated polyesters are preferred for use in the present process which are then further polymerized through cross linking, generally with another unsaturated monomer, such as styrene, in the presence of a suitable peroxide catalyst, e.g. benzoyl peroxide. There are many polyesters available on the market today which can be employed to accomplish the unique results of the present invention which are generally sold under proprietary trade names, e.g. Multron polyesters as manufactured by Mobay Chemical Company.

Suitable polyurethanes which can be employed herein include those polymers which contain a significant number of urethane groups, regardless of what the balance of the molecule comprises, e.g. epoxy and polyester groups. Polyurethanes are generally produced by the combination of a polyisocyanate with a reactant having at least some hydroxyl groups, e.g. glycols and the like which reaction is thereafter catalyzed, e.g. using a tertiary amine. Either one or two component solventless systems can be employed as long as the viscosity — temperature relationship of the urethane polymer is suitably balanced to allow proper application. Typical urethanes for use herein can be a prepolymer comprising 2, 4 - tolylene diisocyanate; 65/35 - Tolylene diisocyanate; 80/20 Tolylene diisocyanate; and the like, which is mixed with a hydroxyl containing compound, e.g. a polyglycol.

The toxilogical constituent comprises those compounds, general metallic compounds, that due to their toxicological properties, causes the coating to be resistant to the attachment of marine fouling. Embodiments contained herein and major test work to date refers to the organometallic compounds as the more promising candidates for extra long life cycle. However, other toxicants for this application can include inorganic metallic compounds comprising mercury, copper and lead, and oxides thereof.

Exemplary of the toxic materials that can be employed herein are: tri-m-butyl tin acetate; tri-m-butyl tin resinate; cuprous oxide; mercuric oxide; triethyltin; tripropyltin; triphenyltin; dibutyltin; hexabutyl distannate in the form of oxides, acetates, or resinates thereof; triphenyl lead acetate; 10, 10' oxybisphenorarsine; dichloro-diphenyl-trichloroethane.

The low molecular weight bituminous extender resin can be of a variety of natural or synthetic materials; good results can be obtained from a high boiling extract of cracked petroleum, such as an asphaltic or phenolic derivative; a resinous derivative of coal commonly known as coal tar; or from low molecular hydrocarbon residues. Material having a SSV viscosity at 210° F of less than about 180, e.g. Stygene R-2 as manufactured by Chemfax Incorporated or Reilley Tar and Chemical's Coal tar resin no. 1077. In general, the most practical sources of materials for this resin extender would be found in either petroleum factions, coal tar, or Naval stores.

In either case, these materials must be of a low molecular weight in order to allow the coating to flow at room temperature and must be relatively free from corrosive impurities.

In the case of urethane coatings, a specially treated extender resin will afford the more desirable properties. For good processing, adequate potlife and freedom from foaming, a water-free resin is necessary. This is obtained by pretreating with sufficient isocyanate to pre-react the absorbed water in the resin solution. This step was found desirable regardless of the type of resin selected.

In addition to the extender resin, the toxicant material, the crosslinking resin i.e. epoxy, polyester, polyol prepolymer) and as desired, the fillers and related extenders, a curing agent, or hardener is required. It is necessary that the various prepolymers described above be subsequently cross-linked in order to attain the unexpected feature of the present invention, that is, the interplay between the polymeric material, the pigments and the toxic material.

In the case of any of these co-reactant materials, it is of no significance, in the context of this invention, which co-reactant is classified as base or curing agent. This is generally dictated by handling properties and manufacturing procedure or preference. It is generally found that the potlife is improved in the case of polyurethane adduct materials, if the various pigments and extending constituents are packaged with the polyols, and the polyurethane component is packaged separately.

Example No. 1

A resinous solution was prepared by combining the following ingredients using high speed dispersion technique.

NOTE: Base and hardener were packaged separately as indicated in the formulation, the two components being subsequently combined just prior to application.

PART I

| | Percent by Weight |
|---|---|
| CROSSLINKING RESIN<br>Low molecular weight Epichlorohydrin/ Bisphenol A–having an average equivalent weight of 185 | 23.6 |
| EXTENDER RESIN<br>Low molecular weight aromatic petroleum hydrocarbon – pour point below 50° F | 16.1 |
| TOXICANT<br>Bis (Tri-N-Butyl Tin) Oxide | 12.8 |
| EXTENDER PIGMENT<br>A fibrous suspension agent consisting primarily of asbestos materials ($N_4Mg_3Si_2O_9$) | 1.1 |
| MISCELLANEOUS<br>Flame blown Silica ($SiO_2$) | 1.0 |
| EXTENDER PIGMENT<br>Barium Sulphate ($BaSO_4$) | 16.2 |
| COLOR ADDITIVE<br>Black Iron Oxide Ferric Oxide ($FeO\cdot Fe_2O_3$) | 16.2 |
| MISCELLANEOUS<br>Phenol ($C_6H_5OH$) Accelerator | 0.1 |

PART II

| | |
|---|---|
| CURING AGENT<br>Polyfunctional amine cure agent having an average equivalent weight of 100 | 12.9 |
| TOTAL | 100 |

The coating solution resultant from this formulation was subsequently mixed and allowed approximately 15 minutes induction time. The viscous solution was applied to the primed steel hullbottom of a steel tugboat. Application was made with both brush and air-type spray equipment, using conventional pressure pots. At the encountered ambient temperature of 60° – 65° F, the coating was observed to have sufficient potlife to allow application using techniques common to the current shipyard practices.

The application was supervised by personnel who were skilled in the handling of solvent type organometallic coatings. These observers noted the reduction in toxic fumes permeating the space adjacent to the freshly coated surface.

The coating was allowed to cure for approximately 24 hours at 50°–65° F., prior to launch.

Subsequently subjected to the warm fouling waters of the Gulf of Mexico and various brackish backwaters for an extended period of time, the coating was observed to provide excellent protection against the accumulation of fouling marine growth.

Example NO. 2

The base for the solventless solution was prepared by combining the following ingredients with high speed dispersion equipment.

NOTE: The base components and amine harderner are kept separated until immediately prior to use, when the two were combined and thoroughly agitated.

PART I

| | Percent by Weight |
|---|---|
| TOXICANT | |

| | |
|---|---|
| Bis (Tri-N-Butyl Tin) Oxide | 11.0 |
| Bis (Tri-Butyl Tin) Acetate | 2.8 |
| EXTENDER RESIN | |
| Low molecular weight aromatic hydrocarbon resin—100% solids pour point below 50° F. | 11.4 |
| EXTENDER PIGMENT | |
| Barium Sulphate (BaSO₄) | 15.2 |
| COLOR ADDITIVE | |
| Iron Oxide - Ferric Oxide (FeO·Fe₂O₃) | 20.1 |
| EXTENDER PIGMENT | |
| Pigmentary Potassium Titanate | 1.3 |
| MISCELLANEOUS | |
| Flame blown Silica (SiO₂) | 1.1 |
| CROSSLINKING RESIN | |
| Low molecular weight Epichlorohydrin/ Bisphenol A - resin having epoxide equivalent of 185 | 28.6 |

The hardener component is packaged separately as follows:

PART II

| | |
|---|---|
| CURING AGENT | |
| Polyfunctional amine curing agent having average equivalent weight of 55. | 8.5 |
| TOTAL | 100.0 |

The base component is dispersed by grinding to a fineness of approximately 4 hegman, using manufacturing techniques common in the coatings manufacturing industry.

The base and hardener components were combined and potlife of the mixture was observed to be adequate to allow spray application.

The coating was applied to the hull of a 40 foot High-Speed Crew Boat. (Note: The hullbottom had been previously sandblasted and primed with a conventional anti-corrosive hullbottom primer).

None of the strong fumes normally associated with the spray application of a conventionally formulated coating containing such a toxicant was observed when spraying this coating.

It was observed that the spray mist and dust which was encountered in the region of the spray fan could easily be rendered harmless through the use of protective goggles and a dust resistant respirator.

Due to the solventless nature of the coating, the desired film thickness of 6 to 10 mils was easily achieved. Also, the absence of solvent allowed immersion of the vessel as soon as coating was tack-free (approximately ten hours after application). The vessel was placed in service in the offshore oil industry of the Gulf of Mexico.

Subjected to repeated high speed operation and overnight docking over a period of at least one year; a severe environment, favorable to foul collection; this coating was obsered to provide excellent long-term resistance to attachment of the various marine organisms.

EXAMPLE NO. 3

Percent by Weight

PART I

| | |
|---|---|
| TOXICANT | |
| Bis (Tri-N-Butyl Tin) Oxide | 7.3 |
| Bis (Tri-Butyl Tin) Flouride | 7.3 |
| EXTENDER RESIN | |
| Low molecular weight aromatic hydrocarbon resin–pour point below 50° F. | 24.3 |
| EXTENDER PIGMENT | |
| Delatom-Diatomaceous Silica | 3.0 |
| Asbestos Fiber (N₄Mg₃Si₂O₉) | 1.8 |
| Barium Sulphate (BaSO₄) | 12.1 |
| MISCELLANEOUS | |
| Flame blown Silica (SiO₂) | 1.4 |
| CROSSLINKING RESIN | |
| Low Molecular weight Epichlorohydrin/ Bisphenol A resin having an average molecular weight of 85 | 35.5 |

PART II

| | |
|---|---|
| CURING AGENT | |
| Polyfunctional Amine (3-Isopropylamino Propylamine) curing agent having an equivalent weight of 39. | 7.3 |
| TOTAL | 100.0 |

The base component and curing agent were manufactured separately and mixed just prior to application.

The solution was subsequently spray applied to an oil-field crew boat at a dry film thickness of 10 mils over a conventional anticorrosive ship-bottom primer.

The test surface was positioned immediately adjacent to a conventional solvented copper-type antifouling — normally recommended for such a service. Coating application properties were similar for both coatings, except that application of the extra heavy build of the solventless coating required more time. No noxious fumes were reported by the applicator.

The coating was allowed to cure for several days prior to launch, as was dictated by the time required for completion of hull repair work.

After the vessel was placed in service, it struck a submerged obstacle, abrading both coated surfaces. The conventional antifouling film was removed whereas the solventless antifouling film was undamaged.

In subsequent service, said solventless coating was observed to supply exceptional protection from fouling growth — markedly superior to the conventional antifouling coating.

EXAMPLE NO. 4

A satisfactory 100 percent solids solution coating system was prepared by selecting a low molecular weight polyol which was subsequently reacted with a polymeric isocyanate having a functionality of 2.4.

Ingredients were as follows:

The low equivalent weight diol (polyether or polyester polyol) is blended with the coal tar. The toxicant and pigments (including thixotropes) are added and ground to a fineness of 4 hegman, using techniques common in paint manufacturing. In this case, the polyisocyanate is reacted with the coal tar polyol solution at an NCO/OH value of 1.1 to 1.

The manufacture of this system provides for two components; the curing agent (the polymethylene — polyphenyl isocyanate) is not added until immediately prior to application of the coating.

Percent by Weight

PART I

| | |
|---|---|
| CROSSLINKING RESIN | |
| Polyether Polyol (Hydroxyl No. 237.5) | 49.2 |
| EXTENDER RESIN | |
| Coal Tar Resin (Viscosity, SSU 210° F., 120) | 9.9 |

| MISCELLANEOUS | |
|---|---|
| Flamed Silica | 1.0 |
| EXTENDER PIGMENT | |
| Barium Sulphate - Barytes | 20.0 |
| Asbestos | 2.1 |
| TOXICANT | |
| TBTA (Tri-Butyl Tin Acetate) | 4.7 |

PART II

| CURING AGENT | |
|---|---|
| Polymeric Isocyanate (32% NCO) | 13.1 |
| TOTAL | 100.0 |

The coating outlined above was applied to two identical metal panels in the laboratory and allowed to cure for four hours at room temperature. At completion of the 4 hour cure, the coating was still tacky, indicating incomplete cure. One was submerged under water and the other allowed to air dry. At the end of 72 hours, both coatings were observed to yield satisfactory films. In subsequent testing in fouling waters, this coating was observed to exhibit good performance as an antifouling medium.

Example NO. 5

A one component, moisture curing version of the solventless polyurethane coating was made in the laboratory using the manufacturing techniques normally used to manufacture urethane prepolymers. The polyol solution is extended with a low molecular weight — coal tar derivative — from which various co-reactants and catalytic impurities had been removed (this assures that potlife and coating stability are within acceptable limits). The low viscosity coal tar functions much as a non-volatile solvent for the polyurethane prepolymer and affords a 100 percent solids coating. Viscosity was low enough to indicate this material for a candidate for airless spray application. It was observed in laboratory testing that a special tar was required to yield a satisfactory storage stability. Attempts to formulate a stable coating with tars containing impurities verified that only specially processed tars would provide the desired storage stability of the 100 percent solids urethane-tar system.

| | Percent by Weight |
|---|---|
| CROSSLINKING RESIN | |
| Polyglycol (Hydroxyl No. 383) | 30.5 |
| Tolylene Diisocyanate | |
| 80/20 Mixed Isomer | 29.5 |
| EXTENDER RESIN | |
| Coal Tar Resin (Viscosity, SSU 210° F., 120) | 30.5 |
| EXTENDER PIGMENT | |
| Asbestos Shorts | 3.5 |
| TOXICANT | |
| Tri-Butyl Tin Acetate | 6.0 |
| TOTAL | 100.0 |

This formula was cast on clean steel panels and was observed to proceed to complete cure when submerged — after having been air dried for approximately 4 hours. When film was completely cured (approximately 48 to 72 hours) the resultant product was tough and elastomeric.

Example No. 6

A two component polyurethane reacted 100 percent solids coating combining a low molecular weight epoxy solution with a non-volatile polyisocyanate solution, such as polymethylene polyphenyl isocyanate, in the following proportions:

| | Percent by Weight |
|---|---|
| PART I | |
| CROSSLINKING RESIN | |
| Epoxy Resin (Epoxide equivalent 189) | 24.1 |
| EXTENDER RESIN | |
| Coal Tar Resin (Viscosity, SSU 210° F. 120; Note: This Coal Tar also pre-reacted as in Embodiment No. 5) | 24.1 |
| MISCELLANEOUS | |
| Flamed Silica | 1.2 |
| EXTENDER PIGMENT | |
| Barium Sulphate | 24.1 |
| TOXICANT | |
| Tri-Butyl Tin Acetate | 6.0 |
| COLOR ADDITIVE | |
| Lampblack | 2.4 |

PART II

| CURING AGENT | |
|---|---|
| Polymeric Isocyanate (32% NCO) | 18.1 |
| TOTAL | 100.0 |

The above formulation exhibited good potlife and cure response. It was also noted that a wide range of flexibility and cure rates are possible by proper selection of epoxy resin.

Listing various catalyst, it was observed that the potlife of the coating outlined above could be controlled from 15 minutes to 48 hours.

A listing of the various catalysts studied is included below.

| | |
|---|---|
| Diethylamine | Diethylanolamine |
| Morpholine | Dibutyl Tin di laureate |
| Deithyenetriamine | |

Miscellaneous products can be added to the present coating to obtain the proper color and leaching rate or to otherwise improve the performance of the coating. Viscosity control may be adjusted through the various thixotropic additives. The leach control pigment is of primary importance in this antifouling concept and must be so selected as to permit uniform toxicant release through the thick film over a long time span. Other pigments that may be associated with this coating would be the various extender pigments as required to control the pigment volume concentration.

We claim:

1. A marine antifouling coating composition comprising
   a. a polymerizable non-volatile synthetic polymeric film former having a molecular weight less than 2,000 selected from the group consisting of epoxy resins, polyesters and polyurethanes;
   b. a curing agent for said polymer;
   c. a marine antifouling toxicant material absorbed in a porous pigment; and
   d. from about 9.9 to 30.5 percent by weight of a bitumen; said composition containing no volatile solvent.

2. An antifouling coating composition as defined in claim 1 wherein said toxicant material is an organometallic compound.

3. An antifouling coating composition as defined in claim 1 wherein said polymer has a molecular weight between 300 to 800.

4. An antifouling coating composition as defined in claim 1 wherein said pigment is selected from the group consisting of silica, asbestos, barium sulfate and potassium titanate.

* * * * *